Jan. 3, 1933.  L. E. DAVIDSON  1,893,359

OPTICAL PROJECTION APPARATUS

Filed Aug. 5, 1931  3 Sheets-Sheet 1

INVENTOR.
Leroy E. Davidson
by Parker & Prochnow
ATTORNEYS.

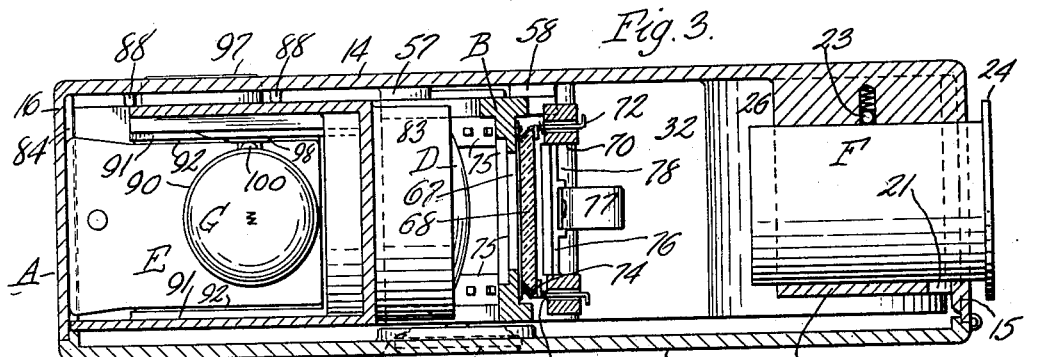
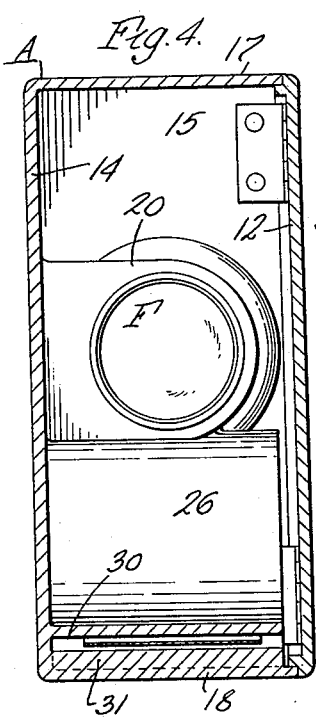
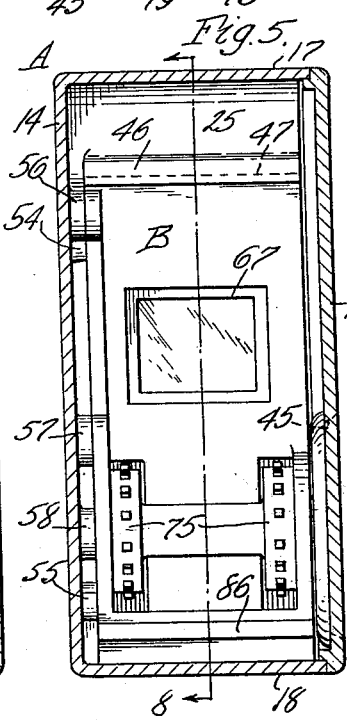
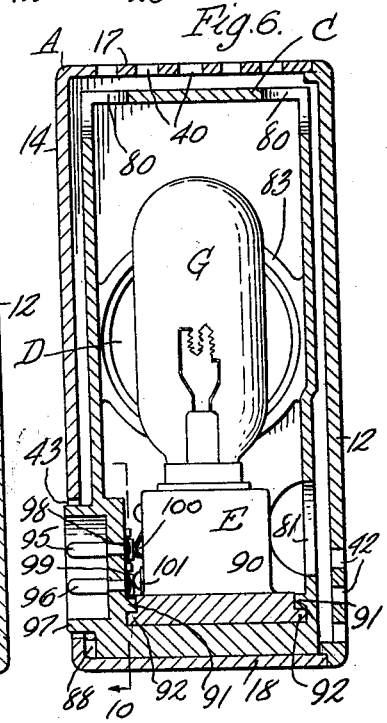
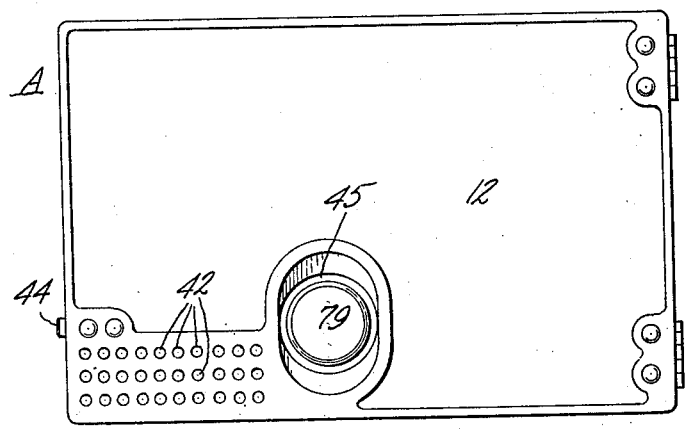

Jan. 3, 1933.  L. E. DAVIDSON  1,893,359
OPTICAL PROJECTION APPARATUS
Filed Aug. 5, 1931  3 Sheets-Sheet 3
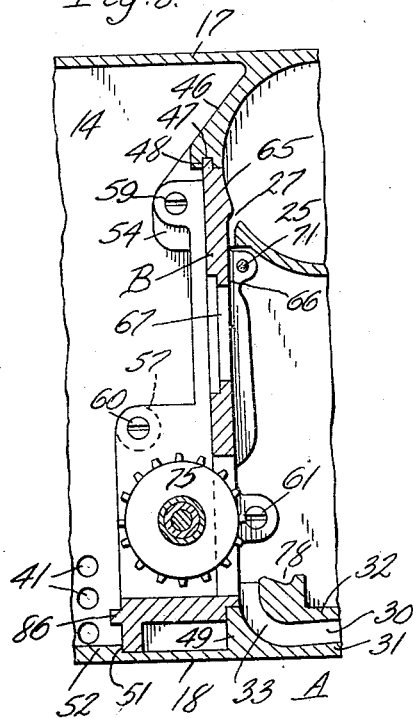
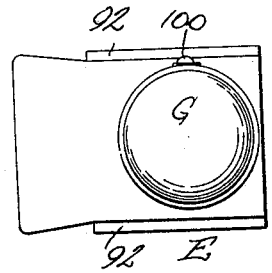
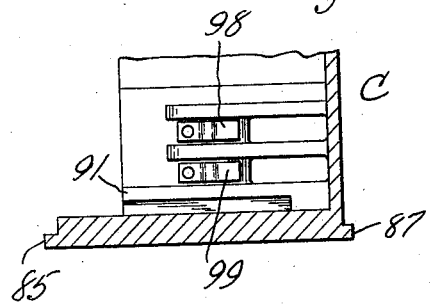
INVENTOR.
Leroy E. Davidson
by Parker & Prochnow
ATTORNEYS.

Patented Jan. 3, 1933

1,893,359

UNITED STATES PATENT OFFICE

LEROY E. DAVIDSON, OF BUFFALO, NEW YORK, ASSIGNOR TO VISUAL DEMONSTRATION SYSTEM, INC., OF BUFFALO, NEW YORK

OPTICAL PROJECTION APPARATUS

Application filed August 5, 1931. Serial No. 555,185.

This invention relates to optical apparatus for projecting an image of an object on a screen or other surface.

The objects of this invention are to provide an apparatus of this kind of compact arrangement and of accurate and rugged construction to provide for efficient utilization of the available light; also to provide an apparatus of this kind, in which the housing and other parts of the apparatus carrying portions of the optical system are accurately molded of a rigid material, and are provided with integrally molded cooperating parts for enabling the parts of the apparatus and optical system to be secured in correct relation to each other and to said housing; also to provide an apparatus of this kind for use in connection with projecting images from a film or flexible subject carrier, and providing the housing with integral compartments for the flexible subject carrier; also to provide an apparatus of this kind, in which the housing and portions thereof are molded of a hardened synthetic gum; also to provide an apparatus of this kind with a lighthouse of improved construction; also to provide an apparatus of this kind with means of improved construction for coiling the ends of the flexible strip or subject carrier within the housing; also to improve the construction of a projection apparatus of this kind in other respects hereinafter specified.

In the accompanying drawings:

Fig. 3 is a sectional plan view thereof, on line 3—3, Fig. 1;

Figure 1:
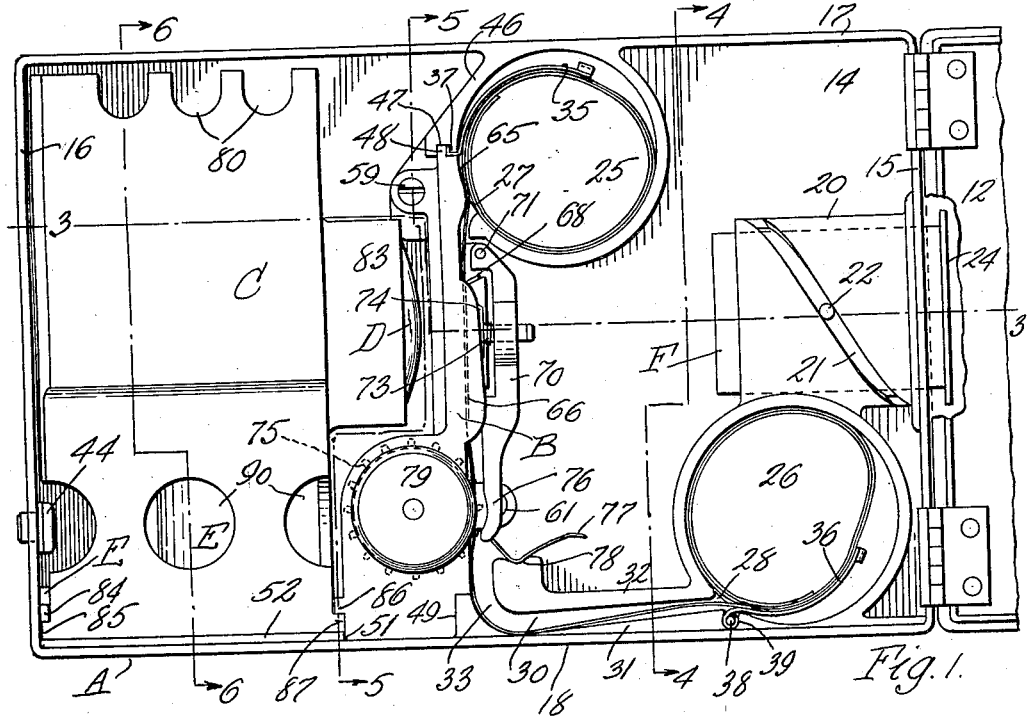
Fig. 1 is a side elevation of a projecting apparatus embodying this invention, a portion of the hinged side of the apparatus being omitted.

Figs. 4, 5 and 6 are transverse sectional elevations respectively on lines 4—4, 5—5, and 6—6 of Fig. 1;

Fig. 7 is a side elevation of the apparatus on a reduced scale, showing the hinged side of the housing;

Fig. 8 is a longitudinal fragmentary sectional elevation thereof, on line 8—8, Fig. 5;

Fig. 9 is a top plan view of the lamp base and lamp removed from the apparatus;

Fig. 10 is a fragmentary sectional view, on line 10—10, Fig. 6, showing the contacts on the housing for supplying current to the lamp base.

The apparatus includes a housing A, within which the parts of the projecting apparatus are arranged. This housing is open at one side thereof to afford easy access to the interior of the apparatus, and a wall or door 12 hinged to the housing may be swung into a position to close the open side of the housing. The housing is provided with a transverse partition B, which is preferably formed as a separate part and secured to the housing, thus dividing the housing into front and rear spaces. The rear space contains a lighthouse C, which, in the particular construction shown, has a condenser lens D mounted thereon. E represents a lamp base removably mounted in the lighthouse which in turn is removably mounted in the housing A.

The housing A is molded or formed of a single piece and is preferably molded or cast in such a way that no further machining or fitting of the housing is necessary to secure the various parts thereon. The housing may be molded of any suitable or desired material, and may, for example, be die cast or made of a non-metallic material molded under pressure, such materials being usually in the form of synthetic gums or phenol condensation products and are well known, and consequently, are not herein described.

By molding the housing and parts thereof in this manner, all parts can be formed with great accuracy, which results in a more efficient apparatus as will be hereinafter explained.

The housing A includes a side wall 14, front and rear walls 15 and 16 and top and bottom walls 17 and 18. The front wall of the housing is preferably provided with an integrally formed part for receiving the projection lens. In the particular construction shown, this part is in the form of an inwardly extending tubular portion 20, the front end of which is formed integral with the front wall 15. By means of die casting or molding, this tubular part can be formed with great accuracy, so that the projection lens will be located in definite relation to other parts of the housing. The tubular part 20 is preferably provided with the usual spiral slot 21 into which a pin 22 of the shell of the projection lens F extends for permitting this lens to be adjusted by turning the same within the tubular part 20 of the housing. The projection lens may be of any usual or suitable construction, the shell of the lens shown having a knurled flange 24 on the outer portion thereof, by means of which the lens may be turned by hand to adjust the same lengthwise in the tubular part 20, and a spring pressed ball or roller 23, Fig. 3, holds the lens frictionally in adjusted position.

The projection apparatus shown is intended for use in connection with a film or other flexible subject carrier of strip form, and preferably the housing is provided with a suitable compartment or compartments for those portions of the flexible strip which are not being projected. The means for feeding the different portions of the flexible strip into and out of position for projection are mounted on the partition B, and will be hereinafter described, and the flexible strip may be fed in either direction to and from compartments 25 and 26, which are preferably also formed integrally with the housing. The compartment 25 is substantially cylindrical in form, having an opening 27 in the cylindrical portion thereof through which the strip may pass. The compartment 25 has one of its ends formed integrally with the side wall 14, and the upper part of the compartment is also formed integrally with the top wall 17 of the housing. The inner surface of each compartment is made smooth, so that the flexible strip can readily be coiled by contacting with the inner wall of the compartment. This is also true with respect to the compartment 26. The lower compartment 26 is also formed at one end thereof integrally with the side wall 14, and the lower part thereof is formed integrally with the bottom wall 18 of the housing. Preferably, the upper portion of the compartment 26 is also molded integrally with the tubular part 20 for the projection lens, which serves the purpose of reinforcing this tubular part and the walls of the compartment 26 and results in a strong and rigid structure. The compartment 26 is provided with an opening 28 in its cylindrical wall through which the film or flexible strip may extend and the housing A also has a channel 30 for guiding the film or strip to and from the partition B. This channel is formed between a guide portion 31 formed on the bottom wall 18 and a wall 32 formed integrally with the side wall 14 of the housing and also with the cylindrical wall or compartment 26. The guide walls 31 and 32 are formed so as to provide a substantially right-angled turn 33 in the channel 30. This channel is open at the open side of the housing so that the film can easily be inserted into the same.

Means are preferably provided for guiding the film or strip while it is being coiled in the compartments 25 and 26. In the particular construction shown for this purpose, springs 35 and 36 are provided in the compartments 25 and 26 respectively, these springs being curved somewhat in accordance with the contour of the compartments and being arranged to extend within the same in such a manner as to cause the film or strip to be initially coiled into a coil of considerably less diameter than the diameter of the compartments 25 and 26. Consequently, as more film or strip is fed into a compartment and the coil increases in diameter, the springs 35 and 36 will yield to permit this increase of diameter, and thus prevent binding of the coils within the compartments as the coils increase in diameter. The spring 35 is provided with a turned-over end 37 adapted to be clamped between the wall of the compartment 25 and the partition B when the same is secured in its operative position, and the spring 36 is held in place by coiling an end thereof about a pin 38. The pin and the portion of the spring coiled thereon are then pushed lengthwise into an opening 39 molded or formed in the wall of the compartment 26, as clearly shown in Fig. 2. Any other means for securing these springs in place and for winding up the films may be employed.

The rear end of the housing may be provided with ventilating openings of any suitable kind to permit circulation of air within the same to dissipate heat from the lamp. In the construction shown, for this purpose, a series of openings 40 is arranged within the top wall 17 of the housing and other series of openings 41 and 42 are arranged in the lower portions respectively of the side wall 14 and door or hinged side 12. 43 is an opening in the side wall for the purpose of permitting a contact plug to pass into the housing to supply electric current to the lamp. 44, Fig. 1, represents a lock of any suitable kind for engaging with a corresponding part on the door 12 to releasably hold the same in closed position. The door or removable wall 12 is preferably also provided with an opening 45 through which a portion of the mechanism for advancing the film or strip may extend.

The housing A is also provided with integrally formed means for accurately positioning the partition B and other parts of the projection apparatus in definite relation to the housing. In order to secure the partition B in correct operative relation to the housing, the wall of the compartment 25 is provided with an extension 46 having a channel 47 formed in the edge thereof, into which channel the upper edge 48 of the partition B fits. The housing is provided with an inwardly projecting extension or ledge 49 formed integral with the bottom wall 18 and forming a portion of the wall of the guide slot 30. The face 50 of this extension 49, together with a face or shoulder 51, formed on a ledge or raised part 52 of the bottom wall of the housing, form a shallow channel within which the lower end of the partition B may slide. Consequently, by fitting the upper edge of the partition into the channel 47 and the lower edge into the channel between the walls 50 and 51, the partition B may be slid from the open end of the housing toward the side wall 14. This positions the partition very accurately with reference to the length of the housing. In order to also position the partition accurately crosswise of the housing, a series of stop faces are provided on the side wall 14 of the housing which are formed by increasing the thickness of the wall 14 at the portions 54 and 55, so that the inner edge of the partition will abut against the faces 54 and 55 when in its correct position laterally of the housing. The partition may then be secured in place by means of screws which engage in threaded holes formed in a series of nuts or parts 56, 57 and 58 molded in place in lugs projecting inwardly from the side wall 14 of the housing. The partition B is provided with corresponding holes through which screws 59, 60 and 61 may pass, the inner ends of the screws engaging in the nuts 56, 57 and 58 respectively, see particularly Fig. 8.

The upper part of the front face of the partition B has a portion 65 shaped to form a small part of the inner wall of the upper film compartment 25, and the portion of the front wall of the partition B immediately below the part 65 is provided with a shallow recess 66 adapted to receive the film or flexible subject carrier. 67 is a rectangular opening in the partition B through which light may pass for projecting the portion of the subject carrier extending across the opening 67, and a glass plate 68 is preferably mounted to press yieldingly against the front wall of the partition at opposite sides of the slot 65 to hold the portion of the film or flexible strip across the opening 67 in a flat upright plane so that accurate projection of that portion of the film results. This glass plate, as shown in Fig. 3, is mounted on a gate 70 hinged at 71 on the transverse partition B. The glass plate 68 is secured to a suitable frame 74 having forwardly extending arms 72 extending through apertures in the pivoted gate 70, and coil springs 73 act on the frame 74 to yieldingly push the glass plate against the front face of the partition B to confine the film in the shallow groove 66. Any other means for guiding the film or flexible strip into proper relation to the opening or aperture 67 may be employed.

The lower end of the partition is preferably provided with a feeding mechanism, including a pair of sprocket wheels 75, the teeth or sprockets of which are adapted to engage in corresponding perforations at the edges of the flexible strip. The lower portion 76 of the gate 70 is formed in the usual manner to cooperate with the teeth and strip to hold the strip or subject carrier in correct relation to the teeth of the sprocket wheels to insure feeding of the strip. The gate is preferably held in its operative position shown in Fig. 1, by means of a spring latch 77 engaging in a notch or recess 78 formed in a part of a wall 32. 79 represents a knurled knob or disk connected with the sprocket wheels and extending through the opening 45 in the hinged side wall or door 12, so that the subject carrier can be actuated by hand for projecting different portions thereof on a screen. Any other means for feeding the film or strip may be employed.

The lighthouse C may be of any suitable construction, but is preferably also molded so as to be accurately positioned in the housing A. In the construction shown, the lighthouse is open at its rear end and is provided with upper and lower ventilating apertures 80 and 81 respectively, these apertures being located near the apertures 40 and 41 of the housing A to provide circulation of air through the lighthouse. The front wall of the lighthouse is provided with means for accurately supporting the condenser lens D in correct relation to the lighthouse, and in the construction shown a forwardly extending, tubular part 83 is formed integrally with the lighthouse and is provided with means for securing the condenser lens therein.

Any desired means may be used for positioning the lighthouse correctly with reference to the housing A. In the construction shown for this purpose, the rear wall of the housing A is provided with an integral ledge or rib 84 arranged slightly above the bottom wall 18 thereof to engage with a shoulder 85 on the lower portion of the lamp housing, and a similar rib or ledge 86 is provided on the partition B, cooperating with a corresponding shoulder 87 on the front face of the lighthouse. Consequently, by sliding the lighthouse crosswise of the housing A into its operative position, the lighthouse will be accurately guided into its correct position and a pair of projecting lugs or stops 88, Figs. 2 and 6, at the intersection of the side wall and bottom of the housing A limits the extent to which the lighthouse may be pushed into the housing. By these means the lighthouse will be correctly positioned in the housing when the door 18 is closed.

A lamp G or other source of light may be arranged within the lighthouse in any suitable or desired manner. In the particular construction shown, the lamp is secured in a socket 90 formed integrally with the lamp base E, and the lamp base is slidable into its correct operative position with reference to the lamp house. In the construction shown for this purpose, inwardly extending ribs or projections 91 are provided in the lower portion of the lamp house which cooperate with shoulders 92 on the base, so that the base may be readily guided into its correct position with reference to the condenser lens D. By sliding the base into the lighthouse through the open end thereof, and by providing this open end at the rear of the lighthouse, the lamp base will be held in operative relation to the apparatus by engagement with the rear wall of the housing A.

Electric current may be conducted to the lamp in any suitable or desired manner. In the construction shown, a pair of terminals 95 and 96 are preferably secured in a tubular extension 97 of the side of the lighthouse, which projection in turn extends through the hole 43 in the side wall 14 of the housing. The inner ends of these terminals are connected to a pair of contact springs 98 and 99 respectively arranged on the inner wall of the lighthouse. The lamp base is provided with a corresponding pair of terminals 100 and 101 which are arranged to engage with the springs 98 and 99 respectively when the lamp base is pushed into the lighthouse into its operative position.

Figure 2:
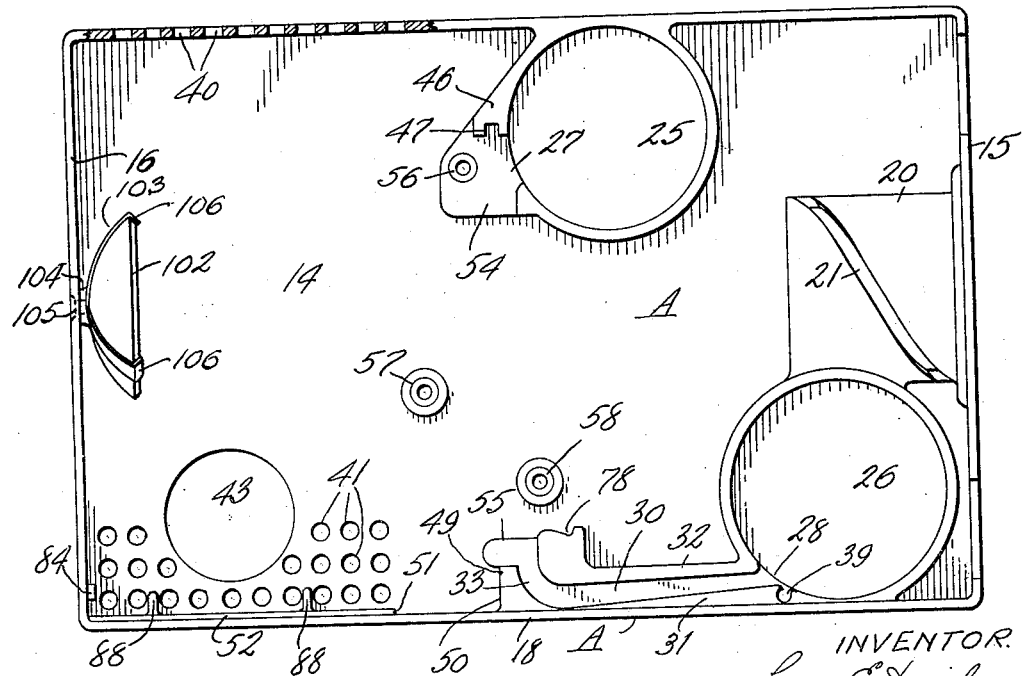
Fig. 2 is a similar view of the housing of the projecting apparatus with all removable parts removed therefrom.

102, Fig. 2, represents a reflector which is mounted on the rear wall of the housing in such position that when the lighthouse is in its operative position, the reflector will be in correct relation to the light source. To accomplish this, the reflector is mounted in a frame or shell 103 having a boss 104 into which the head of a rivet 105 fits. A hole to receive the rivet is molded into the housing so that the frame is placed accurately to position the frame in exactly the correct relation to the optical axis of the apparatus. The outer end of the rivet is then headed and the reflector which is preferably made of glass is then placed into the frame by bending over one of a plurality of lugs 106. In order to utilize the maximum reflected light, the reflector is so placed that the reflection of the convolutions of the filament of the lamp, shown in Fig. 6 will be reflected between the convolutions of the filament itself so that none of the reflected light will be intercepted by the filament itself. This also results in more uniform field of light passing to the condenser lens, and a more uniform field of illumination. This increased efficiency also results partly from the forming of the hole for the rivet 105 during the molding of the housing, which insures great accuracy in positioning the reflector without adding to the cost of the apparatus. Other means for accurately securing a reflector in correct relation to the housing and optical system may be employed.

The projecting apparatus described has the advantages of being compact in form so that it can be carried in a pocket and of being accurately made because of the fact that the parts of the apparatus which support parts of the optical projecting system are either cast or molded on the housing itself in correct relation to each other or are arranged so that they are accurately positioned after assembly without depending upon the skill of the person assembling the parts. By providing this accuracy by means of integrally molded parts, all apparatus of this kind will be alike, and no allowance need be made for inaccuracy or tolerances in assembly. Consequently, the light can be more efficiently used, and a brighter image results, so that the apparatus can be used in a room without darkening the room. This increase in efficiency is due partly, for example, by arranging the condenser lens so that the outer edges of the circular field of light projected by the same coincide very nearly with the corners of the aperture or opening 67, in which the part of the film to be projected is framed. This eliminates a loss of light which is necessary in other apparatus of this kind heretofore made, in which it was necessary to project a field of light of considerably greater diameter than the diagonals of the opening 67, in order to provide tolerances and to compensate for inaccuracy in the relative arrangement of the parts. Another advantage of decreasing the field of light projected by the condenser lens against the partition B is that less heating of the partition results, so that the danger of overheating the film or strip is greatly reduced. By integrally molding the portions of the apparatus which support other parts of the optical projecting system, other increases in efficiency are obtained, and a very accurately projected image results.

I claim as my invention:

1. An optical projection apparatus having a molded housing, an optical system arranged on said housing, and integrally molded parts on said housing for accurately positioning the several parts of said optical system in correct optical relation to each other and to said housing.

2. A projection apparatus having a molded housing, a projecting lens mounted on said housing, means molded on said housing for holding said lens in definite relation to said housing, and parts molded on said housing for definitely locating a light source and a condenser lens in correct optical relation to said projecting lens.

3. A projection apparatus having a molded housing, a projecting lens mounted on said housing, a guide tube for said projecting lens molded integrally with said housing, and parts molded on said housing for definitely locating a light source and a condenser lens in correct optical relation to said projecting lens.

4. A projection apparatus having a molded housing, a projection lens mounted on said housing, a partition arranged in said housing and having a projection aperture through which light passes to the object to be projected, means formed integrally with said housing for holding said partition in correct optical relation to other parts in said housing, a source of light, and a condenser lens arranged in said housing and held in correct optical relation to other parts of said apparatus by means of integrally molded parts on said housing.

5. A projection apparatus for projecting subject matter from a flexible strip, said apparatus having a molded housing, a projecting lens mounted on said housing, compartments molded integrally with said housing for receiving said flexible strip, means for feeding said strip from one compartment to another, and means in said housing cooperating with said projecting lens for projecting images from said flexible strip.

6. A projection apparatus for projecting subject matter from a flexible strip, said apparatus having a molded housing, a projecting lens mounted on said housing, a guide tube formed integrally with said housing, and in which said projecting lens is adjustably arranged, compartments for said flexible strip formed integrally with said housing, one of said compartments being connected with the inner end of said guide tube for reinforcing said guide tube, means for feeding said flexible strip from one compartment to another, and means in said housing cooperating with said projection lens for projecting images from said flexible strip.

7. A projection apparatus, having a housing molded of rigid material, a projection lens mounted on one end of said housing, a transverse partition in said housing dividing said housing into two spaces, said partition being accurately positioned with reference to said housing by integrally molded portions of said housing, means on said partition for moving a flexible strip to place different portions thereof into position for projection, compartments formed integrally with said housing at one side of said partition for containing said flexible strip, and a lighthouse arranged on the other side of said partition and including a light source and a condenser lens, said lighthouse being accurately positioned with reference to said housing by integrally formed portions on said partition and said housing, for accurately positioning parts of said apparatus in correct optical relation to each other.

8. A projection apparatus having a housing molded of rigid material, a projection lens secured in said housing, a partition dividing said housing into two spaces, guides integrally formed on said housing for permitting said partition to be placed in fixed relation to said housing, means on said partition for placing a subject carrier into various operative relations for projection of parts thereof, a source of light, and a condenser lens, both of which are held in correct relation to said housing and said partition by means of integral guide parts on said housing and said partition.

9. A projection apparatus, having a housing molded of rigid non-metallic material, a projecting lens, a part on said housing for accurately positioning said projecting lens, a partition in said housing also molded of non-metallic material, integrally molded parts on said housing and said partition for guiding said partition into correct relation to said housing, a lighthouse for containing a source of light and also molded of non-metallic material and having integrally molded portions cooperating with integrally molded portions of said housing to accurately position said lighthouse in correct relation to said housing and said partition.

10. A projection apparatus having a housing molded of a rigid non-metallic substance, a transverse partition in said housing, a lighthouse including a source of light in said housing, said housing, partition and lighthouse all carrying parts of an optical projection system, and integrally molded parts on said housing for accurately positioning said partition and lighthouse in correct relation to said housing.

11. A projection apparatus having a housing molded of a rigid non-metallic substance, a transverse partition in said housing, a lighthouse arranged at one side of said partition, said housing, partition and lighthouse each supporting parts of an optical projecting system, integrally molded parts on said housing for supporting said partition and lighthouse in correct relation to said housing, a base for supporting a source of light, said lighthouse and base being molded of non-metallic material and including integral portions for definitely positioning said lamp base in fixed relation to said lighthouse.

12. A projection apparatus, having a housing molded of non-metallic rigid material, a partition and lighthouse also molded of rigid, non-metallic material, cooperating integrally molded parts on said housing, partition and lighthouse for positioning said parts in fixed relation to each other, said housing, partition and lighthouse each carrying portions of an optical projecting system and said lighthouse being slidable into and out of its operative position in said housing through an open side of said housing, said lighthouse having an open end, a lamp base adapted to be passed into said open end of said lighthouse and held in place by said housing when said lighthouse is inserted into its operative position.

13. A projection apparatus having a housing, means for supporting portions of an optical projecting system within said housing, a lighthouse secured within said housing, a lamp base slidably arranged in said lighthouse, electrical contacts on said lighthouse, said housing having an aperture in alinement with said contacts, and cooperating parts on said lamp base and said contacts for transmitting current from said contacts to said lamp base when said lamp base is in correct relation to said lighthouse.

14. A projection apparatus having a housing molded of a phenolic condensation product, a plurality of parts in said housing also molded of a phenolic condensation product, said housing and said parts carrying different portions of an optical projecting system, and integrally molded portions on said housing and said parts for guiding said parts into correct relation to said housing to place the portions of the projecting system carried by said housing and said parts into correct optical alinement with each other.

15. A projection apparatus, having a housing molded of rigid non-metallic material, a projecting lens mounted on said housing, a lighthouse having a source of light arranged therein, said lighthouse being molded of rigid non-metallic material and having a tubular portion formed integrally therewith, a condenser lens secured in said tubular portion, integral cooperating parts molded on said lighthouse and said housing for guiding said lighthouse into correct relation to said housing, and means for moving an object carrier to be projected into correct relation to said condenser lens and said projecting lens.

16. A projection apparatus including a housing molded of a rigid material, and having an optical system mounted therein, said housing having integrally formed compartments for a flexible subject carrier, springs in said compartments for engaging the subject carrier as the same is pushed into a compartment for initially coiling said subject carrier into coils of materially smaller diameter than that of said compartments, and integral portions on said housing for receiving one end of each of said springs for correctly locating the same with reference to said compartments.

17. An optical projection apparatus having a housing and parts arranged therein for supporting an optical projecting system, said housing and parts being molded of a phenolic condensation product.

18. An optical projection apparatus, having a molded housing an optical system including a reflector arranged in said housing, said housing having an aperture molded therein and a reflector frame including a part extending into said aperture for accurately securing said reflector in correct relation to said housing and to other parts of said optical system.

LEROY E. DAVIDSON.